United States Patent
Inagaki et al.

(10) Patent No.: US 6,644,709 B2
(45) Date of Patent: Nov. 11, 2003

(54) ADJUSTABLE CARGO SYSTEM

(75) Inventors: Toru Inagaki, Holland, MI (US); John A. Hall, Holland, MI (US); Michael D. Luyckx, Grand Rapids, MI (US); Sangwon Choi, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/961,807

(22) Filed: Sep. 24, 2001

(65) Prior Publication Data

US 2003/0057724 A1 Mar. 27, 2003

(51) Int. Cl.[7] .................................................. B60R 9/06
(52) U.S. Cl. ................................ 296/37.16; 296/37.14
(58) Field of Search ......................... 296/100.09, 37.16, 296/37.14, 37.8, 37.2, 37.3, 37.5, 37.6

(56) References Cited

U.S. PATENT DOCUMENTS

| | | | | |
|---|---|---|---|---|
| 3,768,858 A | * | 10/1973 | Boismier | |
| 4,828,312 A | * | 5/1989 | Kinkel et al. | 296/37.6 |
| 4,830,242 A | * | 5/1989 | Painter | 296/37.6 X |
| 5,201,561 A | * | 4/1993 | Brown | 296/37.5 |
| 5,322,335 A | | 6/1994 | Niemi | |
| 6,015,071 A | | 1/2000 | Adomeit et al. | |
| 6,050,202 A | | 4/2000 | Thompson | |
| 6,092,852 A | * | 7/2000 | Lawrence | 296/37.6 |
| 6,435,594 B1 | * | 8/2002 | Ekonen et al. | 296/100.09 |

* cited by examiner

Primary Examiner—Joseph D. Pape
(74) Attorney, Agent, or Firm—Price, Heneveld, Cooper, DeWitt & Litton

(57) ABSTRACT

An adjustable cargo system comprising a pair of hinged panels which move from a flat cover position providing maximum flat storage for the rear area of a vehicle to multiple additional positions to expose storage bins therebelow to provide storage behind and/or enclose the otherwise open area of the vehicle for security. In a preferred embodiment, such panels include a hinge extending between the panels with the forward most panel being hingedly coupled to a vehicle. The end of one of the panels includes a latch such that the panels can be locked in different positions. In one embodiment, left and right side pairs of first and second panels are provided.

28 Claims, 7 Drawing Sheets

ADJUSTABLE CARGO SYSTEM

BACKGROUND OF THE INVENTION

The present invention relates to a vehicle cargo system and, more particularly, one for selectively dividing the rear area of a vehicle into multiple storage areas.

With today's increasingly mobile society, vehicles are being employed for multiple functions in addition to the normal work commute. The popularity of sport utility vehicles has highlighted the need for vehicles which have sufficient storage or cargo areas to accommodate multiple functions of a vehicle in addition to the typical transportation of groceries, household items, and the like. Vehicles frequently are used for extended vacations as well as day trips to beaches, parks, and other short-term locations which may require unique storage capabilities. In addition, the architecture of vehicles themselves is changing with emphasis on flexibility of designs to allow vehicles to serve multiple functions. One such vehicle is a hybrid vehicle, such as a hatchback, sedan, or sport utility vehicle with a removable rear cab cover to take on the form of a pickup truck type vehicle.

With sport utility vehicles, conventional automobiles, and hybrid vehicles which can be converted from one form to another, there exists a need for increased flexibility in the interior configuration of the vehicle. Some flexibility is provided in the seating arrangements of many such vehicles which may employ fold-down and/or removable seats and fold-down panels to convert the rear seating area of a vehicle into a large cargo handling area. Some commercially available vehicles, for example, have fold-down panels attached to the backs of mid-row seats which enclose areas behind the seats when folded down to provide a flat continuous storage area. U.S. patent application Ser. No. 09/939,189 (Attorney Docket 026032-3711) entitled SEATING AND CARGO STORAGE SYSTEM FOR A VEHICLE, filed on Aug. 24, 2001, discloses a flexible seating system in which modular seats provide flexible storage and seating configurations. Other flexible storage and cargo holding designs are disclosed in U.S. Pat. No. 6,015,071 entitled VEHICLE STORAGE DIVIDER and U.S. Pat. No. 6,050,202 entitled STORAGE DIVIDER SHELF.

Thus, although some attention has been given to selective cargo configurations by employing movable panels and the like, there exists a need for an adjustable comprehensive cargo system which accommodates the need for hybrid vehicles as well as other vehicles having a reconfigurable rear passenger compartment.

SUMMARY OF THE INVENTION

The system of the present invention provides such flexibility by incorporating two hinged panels which can move from a flat cover position providing maximum flat storage for the rear area of a vehicle to multiple additional positions to expose storage bins therebelow to provide storage behind and/or enclose the otherwise open area of the vehicle for security. In a preferred embodiment, such panels include a hinge extending between the panels and a hinge coupling the forward edge of the forward panel to the vehicle. The end of one of the rearward panel includes a latch such that the panels can be locked in different positions. The panels selectively cover first and second storage areas which may include removable and/or invertable storage bins to further add to the flexibility of the system. In a preferred embodiment, the cargo area accommodates left and right pairs of such first and second panels. In one embodiment of the invention, the latch associated with the panels includes a removable latch bar for receiving and locking the forks of one or two bicycles which can be stored in the rear cargo area of a vehicle having an opening in the upper rear area of the vehicle.

These and other features, objects and advantages of the present invention will become apparent upon reading the following description thereof together with reference to the accompanying drawings.

DETAILED DESCRIPTION OF THE PREFERRED EMBODIMENT

Figure 1:
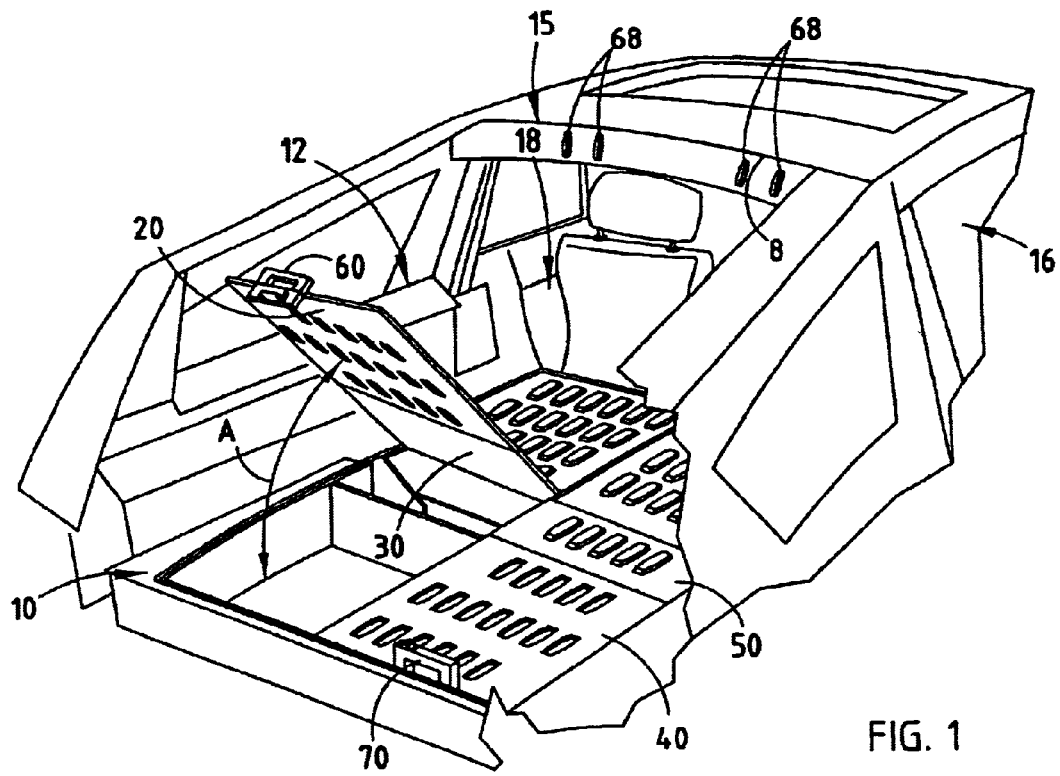
FIG. 1 is a fragmentary, right rear perspective view of a vehicle showing left and right side adjustable cargo panels of the present invention.
Figure 2:
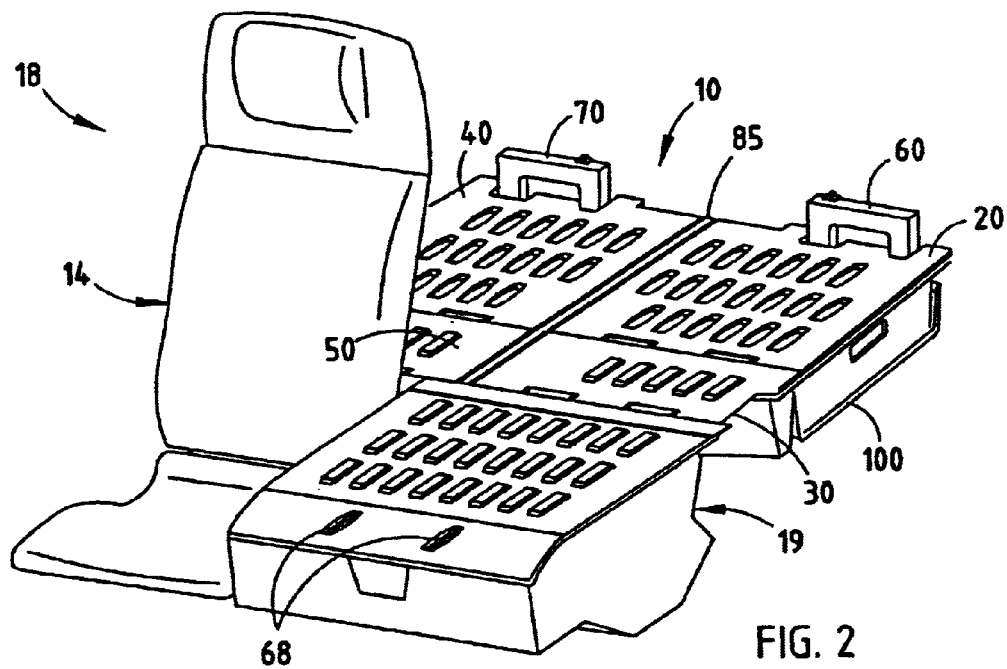
FIG. 2 is a fragmentary, front left perspective view of the adjustable cargo panels and rear seat area shown removed from the vehicle.
Figure 3:
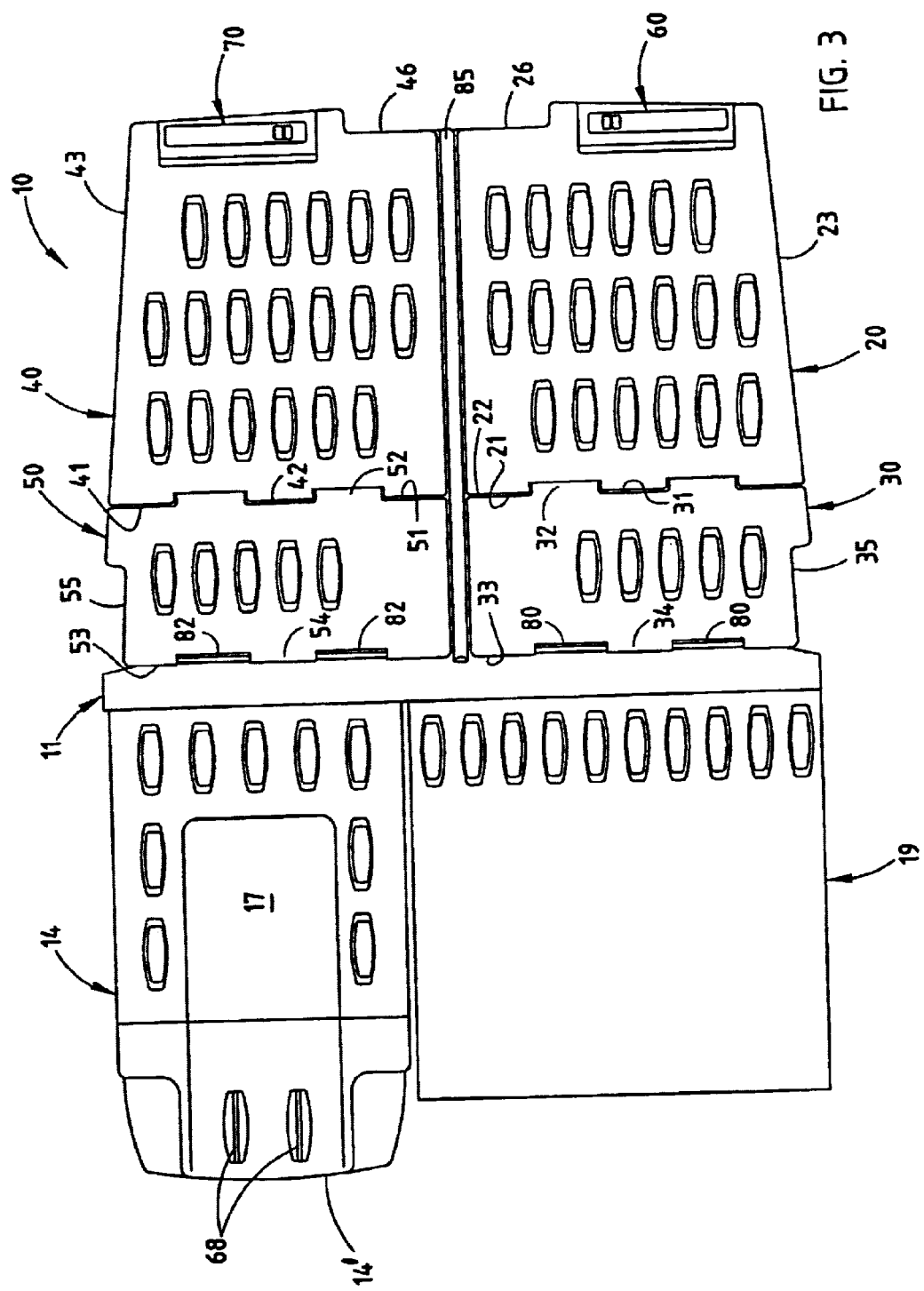
FIG. 3 is a top plan view of the cargo dividing system shown in FIGS. 1 and 2, shown with the vehicle seat of FIG. 2 in a lowered position.

Referring initially to FIGS. 1–3, there is shown the adjustable cargo and divider system 10 of the present invention, which can be mounted within the rear storage or cargo area 12 of a vehicle, such as a hybrid vehicle, 15 shown in FIG. 1. Such a vehicle includes a front passenger area 16 located forwardly of a rear seating area 18, which may include a modular seating structure, such as disclosed in the above-identified patent application entitled SEATING AND CARGO STORAGE SYSTEM FOR A VEHICLE, the disclosure of which is incorporated herein by reference.

The rear seating area, as seen in FIGS. 2 and 3, may include a number of seating configurations, such as a modular seat 14 which can be raised to a use position, as seen in FIG. 2, or lowered, as seen in FIG. 3, exposing the rear surface 17 of the seat which may include one or more storage pockets or bins. Adjacent seat 14, there may be a storage module 19 which has a hinged cover to allow access to the covered storage bin of module 19. Alternately, the rear seating area 18 can be configured with two seats with or without a center console or in any other desired configuration inasmuch as the modular seats and storage units 14 and 19, respectively, can be selectively removed from the vehicle by disconnecting them from the vehicle floor and a support member 11 (FIG. 3) to which the cargo system 10 is also hingedly attached.

The cargo system 10 includes a left side pair of panels 20 and 30 and a right side pair of panels 40 and 50. The first panels 20, 40 include at one end a combined handle and latch assembly 60 and 70, respectively, which are pivotally mounted to panels 30 and 40, respectively, and can be moved from a flush position, as shown in FIG. 3, to a raised position, as shown in FIG. 2 for moving the panels 20, 30, 40, and 50 to a variety of positions as will be discussed in greater detail below with respect to the remaining figures.

The rear or first panels 20 and 40 have a forwardly facing end 21 and 41, respectively, (FIG. 3) which are hingedly secured to rearwardly facing edges 31, 51 of the forward or second panels 30 and 50, respectively, by means of alternately staggered interleaved mounting bosses 22, 32 and 42, 52, respectively, receiving pivot pins therein for providing a hinged interconnection of the first panels 20, 40 to the second panels 30, 50. Similarly, panels 30, 50 have a forwardly facing edge 33, 53, respectively, which include alternately staggered interleaved mounting bosses 34, 54 for receiving pivot pins which extend therethrough and into alternately staggered bosses 80, 82 extending rearwardly from mounting beam 11 in vehicle 15 to hingedly mount the forward edges 53, 33 of the cargo system 10 to the vehicle.

Panels 20, 30, 40, and 50 are shaped to substantially overly and selectively cover the rear area 12 of the vehicle 15 when lying in the flat position shown in FIGS. 2 and 3 and may include tapered or otherwise configured outer edges 23, 35, 43, and 55, respectively, (FIG. 3) for such purpose, depending upon the particular shape of the rear storage area 12 of a given vehicle 15. A center divider rib 85 extends from one of the storage bins to provide support for the panels in the rear storage area.

Figure 4:
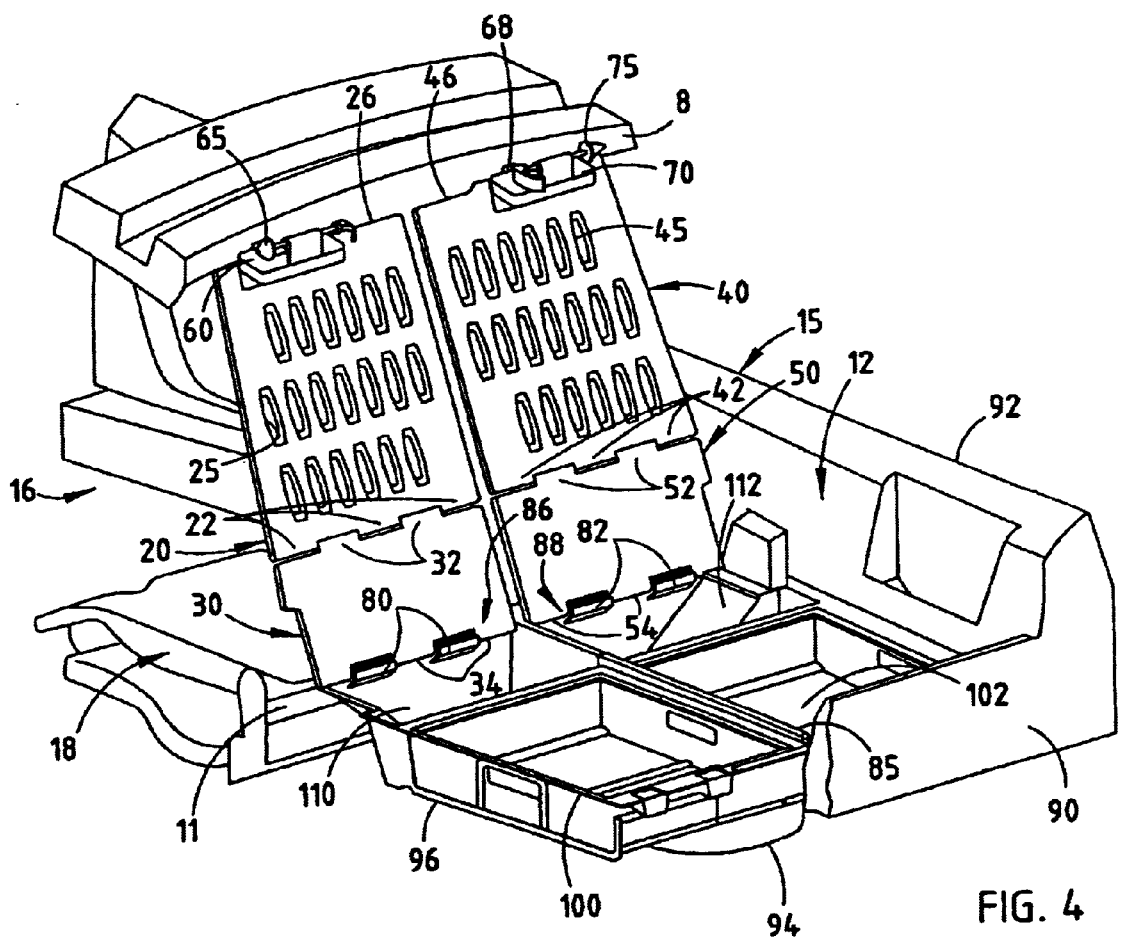
FIG. 4 is a fragmentary, left rear perspective view of the adjustable cargo system showing the panels in a coplanar position, enclosing the front passenger area of a vehicle.

The rear storage area 12 of the vehicle, as best seen in FIG. 4, is defined by a rear bulkhead 90, side bulkheads 92 (right side only shown) and a support floor 96 defining a spare tire wheel well 94 and a generally rectangular storage area for receiving removable storage bins 100, 102 which are selectively covered by panels 20 and 40, as seen in FIGS. 2 and 4. Panels 20, 40 provide selective access to storage bins 100, 102 for items which may be accessed more frequently than items selectively enclosed by panels 30 and 50 which enclose storage bins 110, 112 located forwardly of removable storage bins 100, 102, and which may receive items which are less frequently accessed, such as tools, flares, and the like, which may be contained in vehicle 15. As seen in FIGS. 1-4, panels 20 and 40 include a plurality of spaced apertures 25, 45 to provide rear visibility when the panels are in the position of FIG. 4 and allow drainage (FIG. 2) into the polymeric storage bin 100, 102 of wet items in the event the vehicle is used for sports, such as diving, water skiing, surfing or other outdoor activities. Wet items may be placed in the rear storage area 12 of vehicle 15. In such a case, bins 100, 102 will be empty and serve as drain bins.

The panels 20, 30, 40, and 50 can be made of a suitable polymeric material, such as polycarbonate, fiber-reinforced resins, acrylics, or other rigid material, including, for example, stamped aluminum or steel treated for the automotive environment, which has sufficient load handling capabilities for carrying the weight of a person and/or items to be held by the floor defined by the upper surfaces of the panels. Similarly, the hinge pins, which are cylindrical rods extending between the staggered mounting bosses, couple panels 20 and 40 to 30 and 50, respectively, and panels 30 and 50 to beam 11. The pins are preferably made of a corrosion resistant material, such as stainless steel, plated steel or the like, with sufficient strength to provide durable hinges between panels 20, 30 and 40, 50 and 30, 50 and support member 11 anchored to the vehicle. By providing dual hinged panels and left and right side panel assemblies, the rear storage area 12 of a vehicle can take on numerous configurations when the rear storage area 12 of vehicle 15 is either open or enclosed by a cab-like cover (not shown). As seen, for example, in FIG. 1, panels 40 and 50 are in their flat lowered position to provide a support floor on the right side of cargo area 12 of vehicle 15, while, as illustrated, panels 20 and 30 can be elevated from a flat storage position by grasping handle 60 and moving the panels, as seen by arrow A, to numerous positions as now described in connection with FIGS. 4–7.

In addition to the flat storage position shown in FIGS. 2 and 3 providing a maximum storage area for the rear cargo area 12 of vehicle 15 in terms of flat storage, both of the double hinged panels 20, 30 and 40, 50 can be pivoted upwardly on the hinges 86, 88 between panels 30, 50 and support member 11 to the position shown in FIG. 4 in which the latches 60 and 70, having catches 69, secure the rear, now top, edges 26 and 46 of panels 20 and 40, respectively, to pins in recessed pairs of spaced sockets 68 mounted to the left and right sides of upper rear roof support member 8 of vehicle 15. In this configuration, the panels 20, 30 and 40, 50 substantially enclose and secure the forward passenger area 16 of the vehicle forwardly of the rear seating area 18. Latches 60 and 70 are lockable, if desired, to securely enclose the forward passenger area 16 of vehicle 15 when the cargo area 12 is not enclosed by a cab or other enclosure. If desired, lockable panels (not shown) can be placed over storage bins 100, 102 and 110, 112 for securing these uncovered storage area when panels 20, 30, 40, and 50 are in the position shown in FIG. 4.

Figure 5:
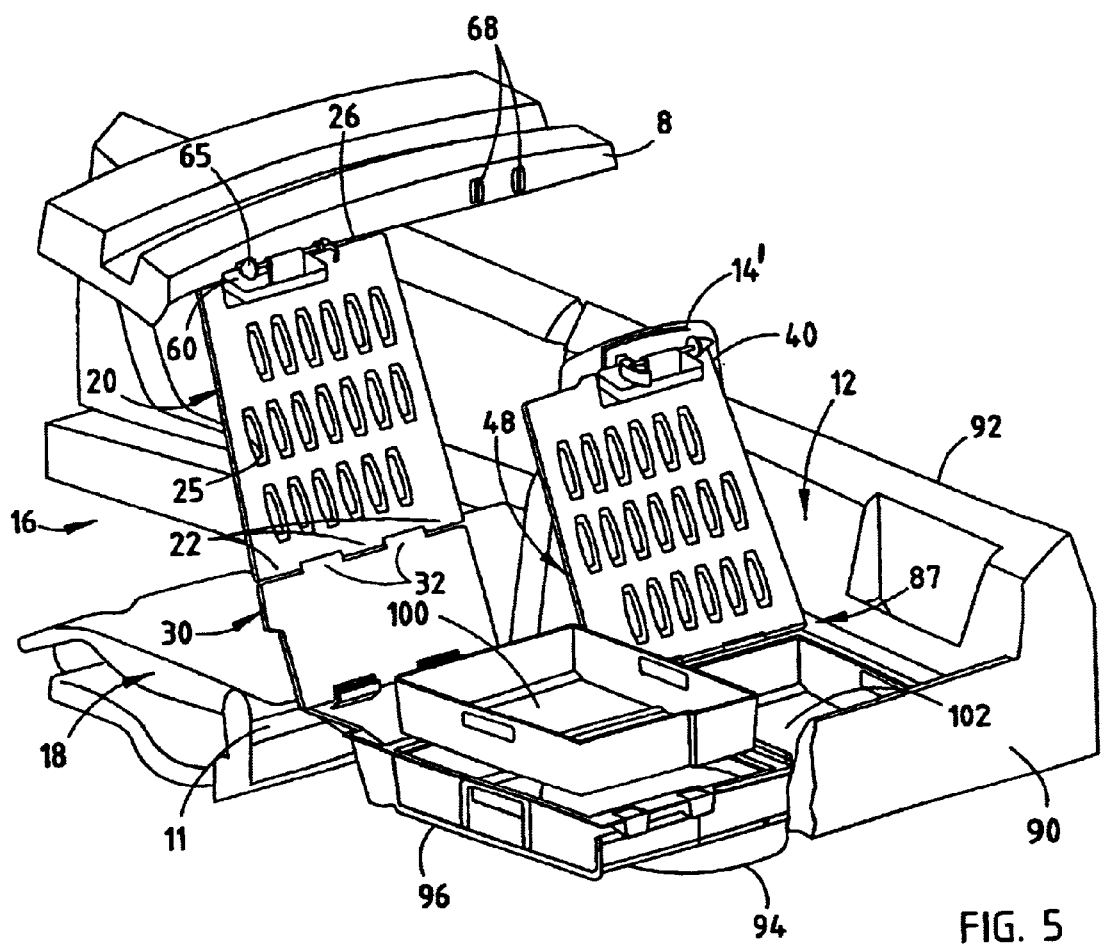
FIG. 5 is a fragmentary, left rear perspective view of the structure shown in FIG. 4, shown with the right side panels moved to an alternate position.
Figure 6:
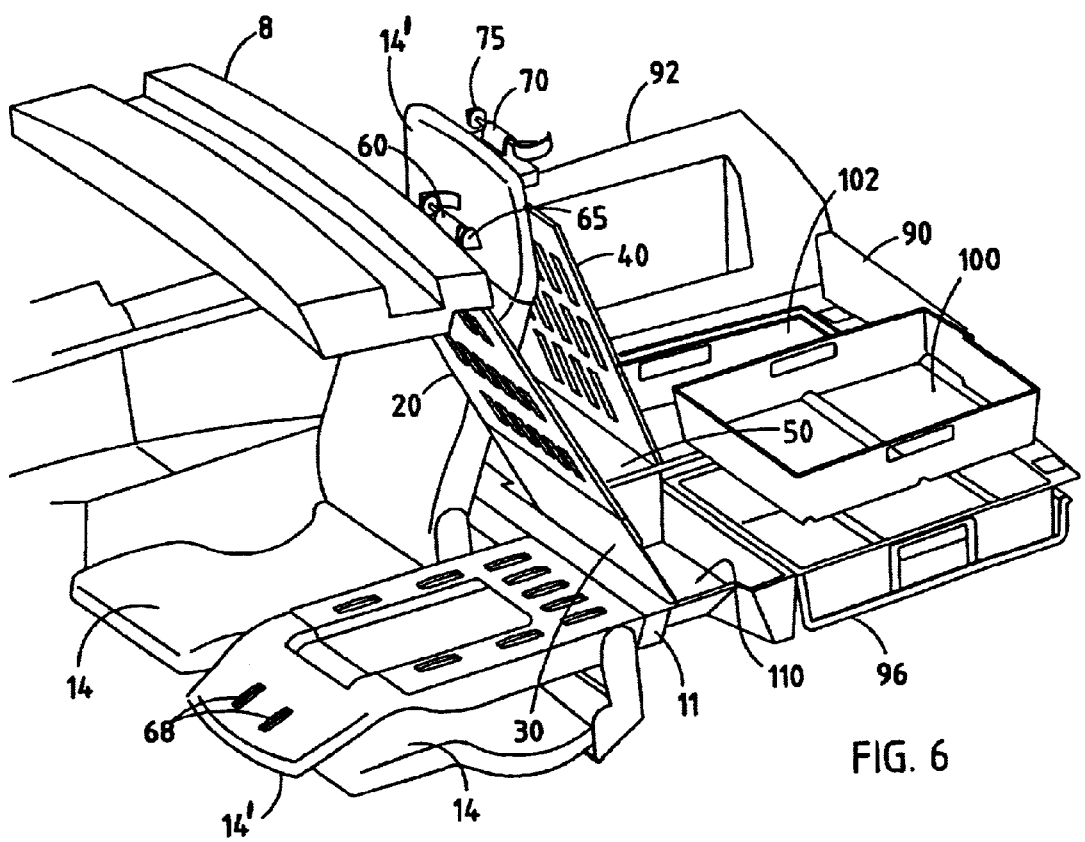
FIG. 6 is a left front perspective view of the structure shown in FIG. 5.

As shown in FIGS. 5 and 6, alternately, the left side panels 20, 30 can be lockably held in a coplanar position secured to support member 8 of the vehicle roof, while the right side panels 40, 50 pivot on hinge 87 between them, such that panel 40 is lockably secured to a mating socket 68 (FIG. 3) in headrest 14' of seat 14 to provide a storage area defined by the generally triangular volume 48 between the forwardly facing surface of panel 40, the top surface of panel 50 and the rear surface of seat 14, while at the same time providing access to storage bins 100, 102. The left and right side panels can be reversed in the positions shown in FIGS. 5 and 6 to provide a triangular storage area behind a left side seat, if desired.

Figure 7:
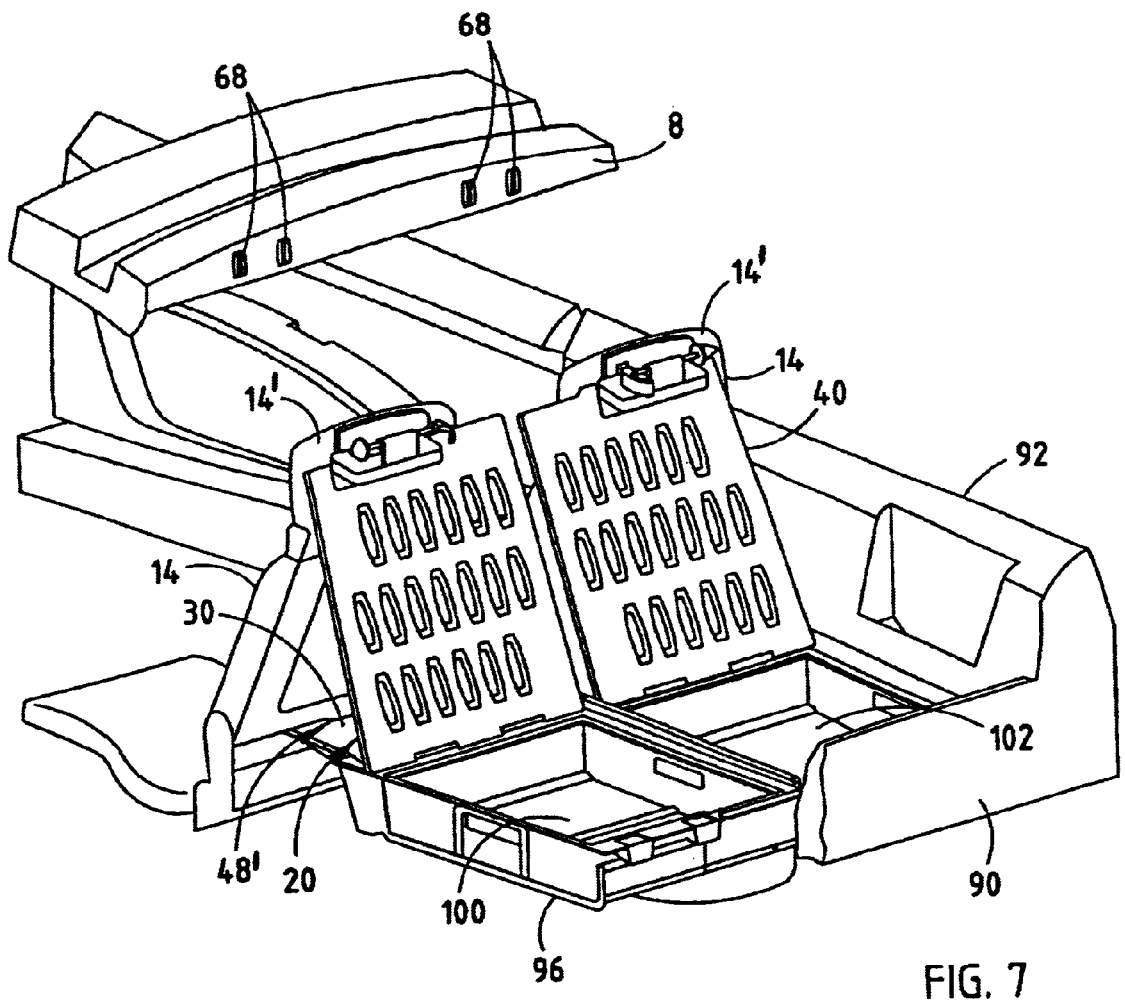
FIG. 7 is a fragmentary left rear perspective view of the cargo system, shown with the left and right side panels in a position engaged with the rear seats.

As seen in FIG. 7, both of the panels 20 and 40 can be locked to the rear of headrests 14' of a pair of rear row seats 14 to provide a double length triangular storage area 48' defined by the upper surfaces of panels 30 and 50, enclosed by the rear of seats 14 and the forwardly facing surfaces of panels 20 and 40.

Figure 8:
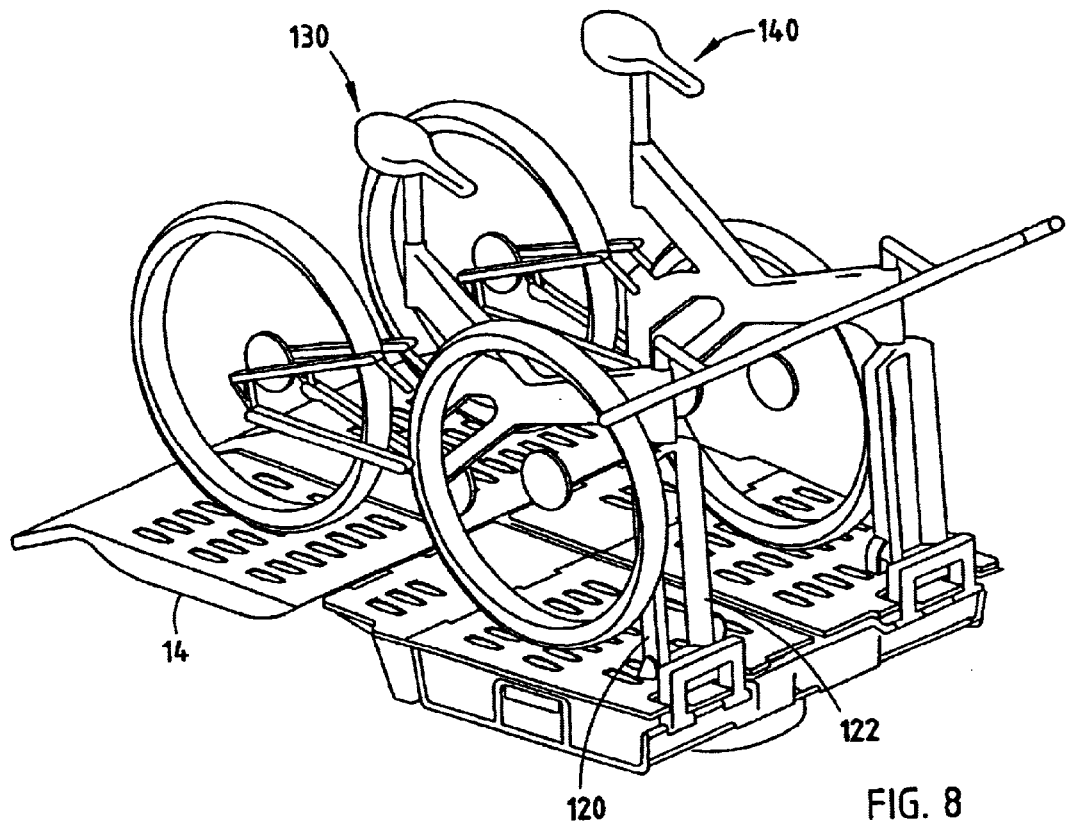
FIG. 8 is a left rear perspective view of the storage system of the present invention, showing a pair of bicycles mounted to the latch of the cargo system.
Figure 9:
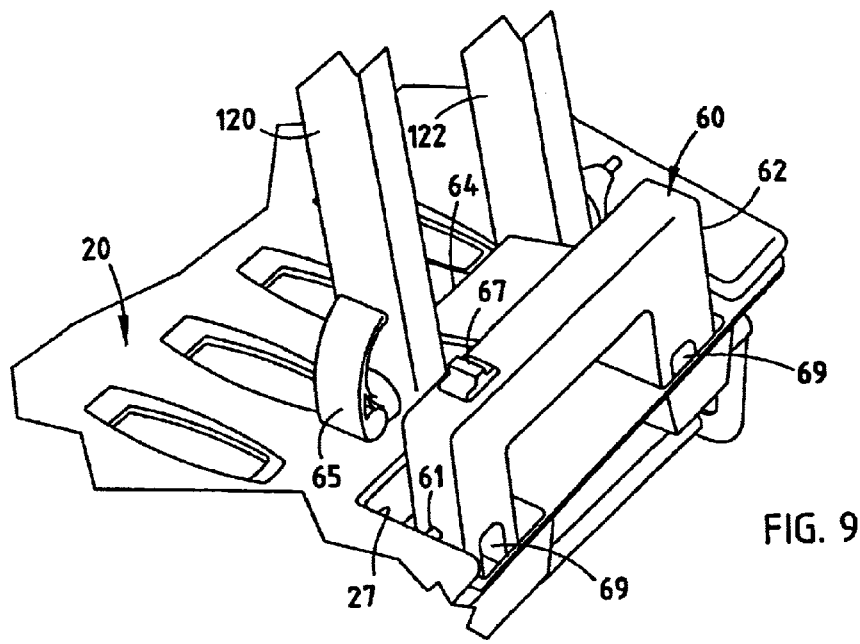
FIG. 9 is a greatly enlarged, fragmentary, perspective view of the locking latch for the panels of the system of the present invention.

The latches/handles 60, 70 are substantially identical and comprise generally U-shaped members 62 (FIG. 9) which are pivotally mounted by axles 61 to U-shaped sockets 27 in panel 20 and a similar shaped socket in panel 40 to allow the handles to pivot from a substantially flush position to a raised position, as seen in FIGS. 2, 8, and 9, and to a locking position shown in FIGS. 4–7. The handles include a cylindrical mounting extension 64 having an aperture extending therethrough for receiving a toggle-type locking pin 65 which can be selectively released by a spring catch 67 from handle/latch 60, if desired. Locking pin 65 is a toggle-type locking bar which can extend, for example, through the forks 120, 122 of a bicycle 130, for example, for the locking of a pair of bicycles 130, 140 (as seen in FIG. 8) within the rear cargo area 12 of a vehicle supported at the front end of the bicycles by the handles/latches 60, 70 and resting on the rear surfaces of folded down seats 14 for the rear wheels of bicycles 130, 140. Thus, latches 60, 70 with spaced catches 69 not only secure the ends 26, 46 of panels 20, 40 to either the headrest 14' of the vehicle seats 14 or alternatively the support member 8 of a vehicle, but also can receive the forks 120, 122 of bicycles 130, 140 for the lockable storage of bicycles in the rear compartment area 12 of a vehicle as well.

Thus, it can be seen that with the system of the present invention by providing a pair of pivoted panels which selectively enclose a pair of spaced storage bins and latches on the free end of one of the panels to selectively latch the panels in angular or coplanar relationship to one another, selective access to the storage bins under the panels of a vehicle can be provided as well as defining additional storage spaces and/or securing the passenger compartment of a vehicle. By providing left and right pairs of pivoted panels, an even greater degree of flexibility is provided.

It will become apparent to those skilled in the art that various modifications to the preferred embodiment of the invention as described herein can be made without departing from the spirit or scope of the invention as defined by the appended claims.

The invention claimed is:

1. An adjustable cargo system for a vehicle having a rear storage area having a front and a rear, said system comprising:
    a first and a second panel for extending between the front and rear of the rear storage area;
    a first hinge coupling said first panel to said second panel, said first hinge extending laterally within the storage area, at a location between the front and rear of the storage area of the vehicle; and
    a second hinge at one end of said second panel, said second hinge extending laterally within the storage area, for coupling said second panel to a vehicle such that said first and second panels can be selectively pivoted about said first and second hinges for movement between a first substantially coplanar position, a second substantially coplanar position or a third position in which said panels are offset with respect to one another.

2. The system as defined in claim 1 wherein when said first and second panels are in said third position they define two walls of a generally triangular cross section storage area.

3. The system as defined in claim 2 wherein said system includes storage bins positioned under each of said panels when said panels are in a first coplanar substantially horizontal position.

4. The system as defined in claim 1 and further including a second pair of first and second panels movable independently of said first named first and second panels, wherein said first panels of said pairs of panels include a plurality of spaced-apart apertures.

5. An adjustable cargo system for a vehicle having a rear storage area comprising:
    a first and a second panel;
    a first hinge coupling said first panel to said second panel; and
    a second hinge at one end of said second panel for coupling said second panel to a vehicle such that said first and second panels can be selectively pivoted about said first and second hinges for movement between a first substantially coplanar position, a second substantially coplanar position or a third position in which said panels are offset with respect to one another, and wherein said first panel includes a latch for lockably coupling said panel to one of a roof support member of a vehicle and headrest of a vehicle seat.

6. The system as defined in claim 5 wherein said system includes storage bins positioned under at least one of said panels when said panels are in a first coplanar substantially horizontal position.

7. The system as defined in claim 5 wherein said first panel includes a handle for use in moving said first panel.

8. The system as defined in claim 5 and further including a second pair of first and second panels movable independently of said first named first and second panels.

9. The system as defined in claim 8 wherein said first and second panels of said second pair includes a first hinge coupling said first panel to said second panel and a second hinge at one end of said second panel for coupling said second panel to a vehicle such that said first and second panels can be selectively pivoted about said first and second hinges for movement between substantially first coplanar position, a second coplanar position or a third position in which said panels are offset with respect to one another.

10. An adjustable cargo system for a vehicle having a rear storage area extending laterally and longitudinally in the vehicle comprising:
    left side and right side pairs of first and second panels, each pair extending longitudinally;
    a first hinge extending laterally with respect to the vehicle for coupling each of said first panels to an associated said second panel; and
    a second hinge at one end of each of said second panels for coupling said second panels to a vehicle in the lateral direction such that said first and second panels of each pair can be selectively and mutually independently pivoted about said first and second hinges for movement between a first substantially coplanar position substantially covering the rear storage area, a second substantially coplanar position or a third position in which said panels are offset with respect to one another.

11. The system as defined in claim 10 wherein said system includes storage bins positioned under at least one of said panels when said panels are in a first coplanar substantially horizontal position.

12. The system as defined in claim 11 wherein said system includes storage bins under each of said first and second panels of said left and right side pairs.

13. The system as defined in claim 10 wherein said first panel of each pair has a free end which includes a handle for use in moving said first panels.

14. The system as defined in claim 10 wherein said panels are polycarbonate.

15. An adjustable cargo system for a vehicle having a rear storage area comprising:
    left side and right side pairs of first and second panels;
    a first hinge coupling each of said first panels to an associated said second panel; and a second hinge at one end of each of said second panels for coupling said second panels to a vehicle such that said first and second panels of each pair can be selectively and mutually independently pivoted about said first and second hinges for movement between a first substantially coplanar position, a second substantially coplanar position or a third position in which said panels are offset with respect to one another, wherein said first panel of each pair has a free end which includes a handle for use in moving said first panels and wherein each of said handles includes a latch for lockably coupling said handles to one of a roof support member of a vehicle and headrest of a vehicle seat.

16. The system as defined in claim 15 wherein each of said storage bins under said first panels are removable.

17. The system as defined in claim 16 wherein said first panels of said left and right side pairs include a plurality of spaced-apart apertures.

18. The system as defined in claim 17 wherein said panels of said left and right pairs are made of a polymeric material.

19. An adjustable cargo system for use with a vehicle having an open rear cargo area which communicates with a forward passenger compartment, said cargo system comprising:

a left and a right side pair of panels, each panel of each of said pairs hinged to one another;

a hinge at one end of each pair of panels for coupling to the vehicle at a forward end of the cargo area of the vehicle; and a latch coupled to an end of each of the pairs of panels for mutually independently moving and holding said pairs of panels between a first substantially horizontal position in which said pairs of panels are substantially coplanar, a second position rotated from said first position enclosing the passenger compartment of the vehicle, and a third position in which said panels are offset from one another to define a triangular storage area near the forward end of the vehicle cargo area.

20. The system as defined in claim 19 wherein said latch includes a handle for moving said pairs of panels and said latch lockably couples said end of said pair of panels to a roof support member of a vehicle when in said second position.

21. The system as defined in claim 19 wherein said latch lockably couples said end of said pair of panels to a headrest of a vehicle seat when in said third position.

22. The system as defined in claim 19 wherein said system includes storage bins positioned under at least one of said panels when said panels are in a first coplanar substantially horizontal position.

23. The system as defined in claim 22 wherein said system includes storage bins positioned under each of said panels when said panels are in said first position.

24. The system as defined in claim 23 wherein at least some of said storage bins are removable.

25. The system as defined in claim 19 wherein said first panels of said left and right side pairs include a plurality of spaced-apart apertures.

26. The system as defined in claim 19 wherein said panels of said left and right pairs are made of a polymeric material.

27. The system as defined in claim 19 wherein said panels are polycarbonate.

28. The system as defined in claim 19 wherein said latch includes a socket for receiving a locking pin such that a bicycle fork can be secured to a pair of panels when in said first position.

* * * * *